United States Patent
Idoni et al.

(10) Patent No.: US 7,151,825 B2
(45) Date of Patent: Dec. 19, 2006

(54) DESK SHARING WITH AUTOMATIC DEVICE RELOCATION

(75) Inventors: Michael A. Idoni, Delray Beach, FL (US); Luiz Henrique Domingos, Boca Raton, FL (US)

(73) Assignee: Siemens Communications, Inc. - Boca Raton, Boca Raton, FL (US)

( * ) Notice: Subject to any disclaimer, the term of this patent is extended or adjusted under 35 U.S.C. 154(b) by 0 days.

(21) Appl. No.: 10/607,765

(22) Filed: Jun. 27, 2003

(65) Prior Publication Data
US 2004/0264664 A1 Dec. 30, 2004

(51) Int. Cl.
*H04M 3/42* (2006.01)

(52) U.S. Cl. ............ 379/201.02; 379/201.05; 379/201.12; 379/913

(58) Field of Classification Search ........... 379/201.01, 379/201.02, 201.05, 201.12, 211.02, 913
See application file for complete search history.

(56) References Cited

U.S. PATENT DOCUMENTS

| | | | | |
|---|---|---|---|---|
| 4,899,373 A | * | 2/1990 | Lee et al. | 379/201.05 |
| 5,557,665 A | * | 9/1996 | Yamamoto | 379/198 |
| 6,252,953 B1 | * | 6/2001 | Gruchala et al. | 379/207.01 |
| 6,584,185 B1 | * | 6/2003 | Nixon | 379/201.01 |
| 6,823,055 B1 | * | 11/2004 | Mayer et al. | 379/201.05 |

* cited by examiner

*Primary Examiner*—Harry S. Hong

(57) ABSTRACT

A system and method for integrating a desk sharing application with a PBX telephonic user identity and feature transfer function is described. The system and method of the invention utilizes the PBX's administrative interface to transfer attributes from a dedicated device to the shared telephone device within an ECP network.

20 Claims, 2 Drawing Sheets

DESK SHARING WITH AUTOMATIC DEVICE RELOCATION

FIELD OF THE INVENTION

The present invention relates generally to shared telephonic communication devices, and more specifically, to a desk sharing system incorporating a method for automatically transferring telephonic settings and configurations from the user's telephone device to another shared telephone device in the same network node.

BACKGROUND OF THE INVENTION

Many office environments dedicate a number of offices and their associated personal computers and telephone devices for visiting or telecommuting staff. Desk sharing (also known as office sharing or real estate/resource hoteling) facilitates the temporary allocation of a limited number of shared resources to a greater number of users. Desk sharing is particularly suitable for office environments where employees work multiple shifts, or where office personnel tend to move between multiple locations.

Desk sharing involves reserving a particular office space for a specific time period. A desk sharing application is a software program, typically incorporating a graphic user interface (GUI), that is used to view shared office spaces and their associated devices and to allow authorized users to reserve these office spaces and resources. Authorized users can select and reserve a shared office and its associated resources from the set of available resources, for a specified period of time. At the end of the desk sharing period, the resource is released and therefore becomes ready to be reserved and allocated by a different user.

Desk sharing applications may be used to reserve a physical location along with the computing and telephonic resources associated with that location. When sharing personal computers (PC) or workstations, the user gains full access to the company computing resources, email and Internet services as a result of logging in to the Local Area Network (LAN) or Wide Area Network (WAN) from any shared and connected workstation. Furthermore, PC users maintain their own customized setting as a result of the system automatically downloading their profile to the utilized workstation upon logging in to the network. The utilization of the user's standard profile while using the shared workstation allows that user to retain the preferred work environment, and consequently improve overall efficiency.

In telephonic networks, each Enterprise Communication Platform (ECP) node typically comprises a Private Branch Exchange (PBX), an administrative terminal and a plurality of dedicated and shared telephone devices. The various components of the ECP node are inter-connected using a number of standard or proprietary interfaces. In these telephonic networks, a device feature transfer exists that allows a user to transfer the user's default (home or dedicated) device features to another shared device within the same ECP node. Such feature transfer is typically accomplished by initiating a dialup modem or TCP-IP connection to the ECP administrator terminal in order to access the ECP administrative libraries (databases) and execute the autoset relocate function.

The autoset relocate feature is an ECP feature offered by Siemens, the assignee hereof, that is known to allow telephone users to retain their telephone configuration automatically after moving to different locations within the same ECP. This ECP feature allows telephone users to move their phone features as needed, without the need for re-plugging or re-jumpering at the main distribution frame and reconfiguring the phone via Administration and Maintenance Order (AMO) commands. The autoset relocate function is typically initiated and completed by means of a user-guided dial-up procedure with acknowledgement tones (or telephone display instructions where available). Authorized users may sign-off their telephones via a dial up procedure using a suitable telephone in the system or via the service terminal (using AMO commands). Subsequently, users can sign-on at the new location via a dial up procedure or via the service terminal (using AMO commands). As a result of using the autoset relocate feature, the user's class of service, group memberships and activated telephone features remain unchanged after the relocation.

However, the autoset relocate feature (which is originally intended for users relocating their telephone devices for an extended period of time) is not integrated with the desk sharing application. Furthermore, the execution of the autoset relocate function in the prior art requires the user or administrator to execute the necessary AMO commands.

The prior art system, however, has several limitations. In particular, because the autoset relocate function is not integrated with desk sharing application, the user is required to perform office space reservation using a desk sharing application separately from the telephonic feature transfer that is accomplished via the autoset relocate task. Additionally, deletion of or otherwise resetting a prior user's configured features from the shared device might be necessary in the prior art system.

Alternatively, the user may choose to manually program the newly shared telephone device with the desired features. While manual configuration of shared telephone devices is an option, as more features are added to telephone devices the manual configuration task becomes more difficult and time consuming, e.g. to accommodate users who frequently use the shared device for only short periods of time. Furthermore, this option does not provide the advantages of integration with the desk sharing application.

SUMMARY AND OBJECTS OF THE INVENTION

The foregoing and other problems and deficiencies in the current desk sharing systems are solved and a technical advance is achieved by the present invention for a more extensive and integrated desk sharing system and method within a single ECP.

Under the present invention an ECP node will posses an expanded telephonic device impersonation capability (where "device impersonation" as used here can include a simple mirroring of features or an actual transfer of functions and features, as will be understood by those skilled in the art) that is integrated with the desk sharing application. The integration of the desk sharing application with the ECP administration application libraries allows the telephone device impersonation to be performed in a single step. The present invention integrates the autoset relocate function with the desk sharing application, thus allowing the autoset relocate function of a device to be performed automatically as part of the desk sharing procedure.

Accordingly, when a user selects to temporarily use a shared office location and its associated telephone device, the device impersonation capability of the present invention allows feature settings to be transferred from the default telephone device to the shared device, for the duration of the reservation period. The transported telephone device profile includes full telephony identity and feature functionality, e.g. class of service, call detail recording, mailbox and phone email integration, caller identity, key layouts and contents.

According to the present invention, the user's default telephone device can be an actual dedicated telephone device or a virtual device in the form of a database entry representing the telephony identity and preferred configuration for the client.

Thus, it is an object of this invention to provide a system and method for transferring full telephony identity and feature functionality from a dedicated telephone device to a second shared telephone device within the same ECP, automatically and dynamically.

It is another object of this invention to integrate the autoset relocate feature transfer function with a desk sharing application.

It is still an object of the present invention to transfer telephonic properties and feature set between the user default telephone device and the allocated shared device, where the default device can be an actual or virtual telephone device.

BRIEF DESCRIPTION OF THE DRAWINGS

The foregoing and other features and advantages of the present invention will become more apparent in light of the following detailed description of exemplary embodiments thereof, as illustrated in the accompanying drawings, where.

DETAILED DESCRIPTION

The present invention generally integrates the ECP administration applications libraries (databases) with the desk sharing application. Thus, when a client uses the desk sharing application to reserve a shared office space or location that has an associated telephone device, a connection to the ECP administrative libraries is established dynamically (or on-demand). Such connectivity to the ECP administrative libraries allows the autoset relocate feature to be performed automatically, thus causing the shared telephone device to be configured with the feature settings of the dedicated telephone device.

Figure 1:
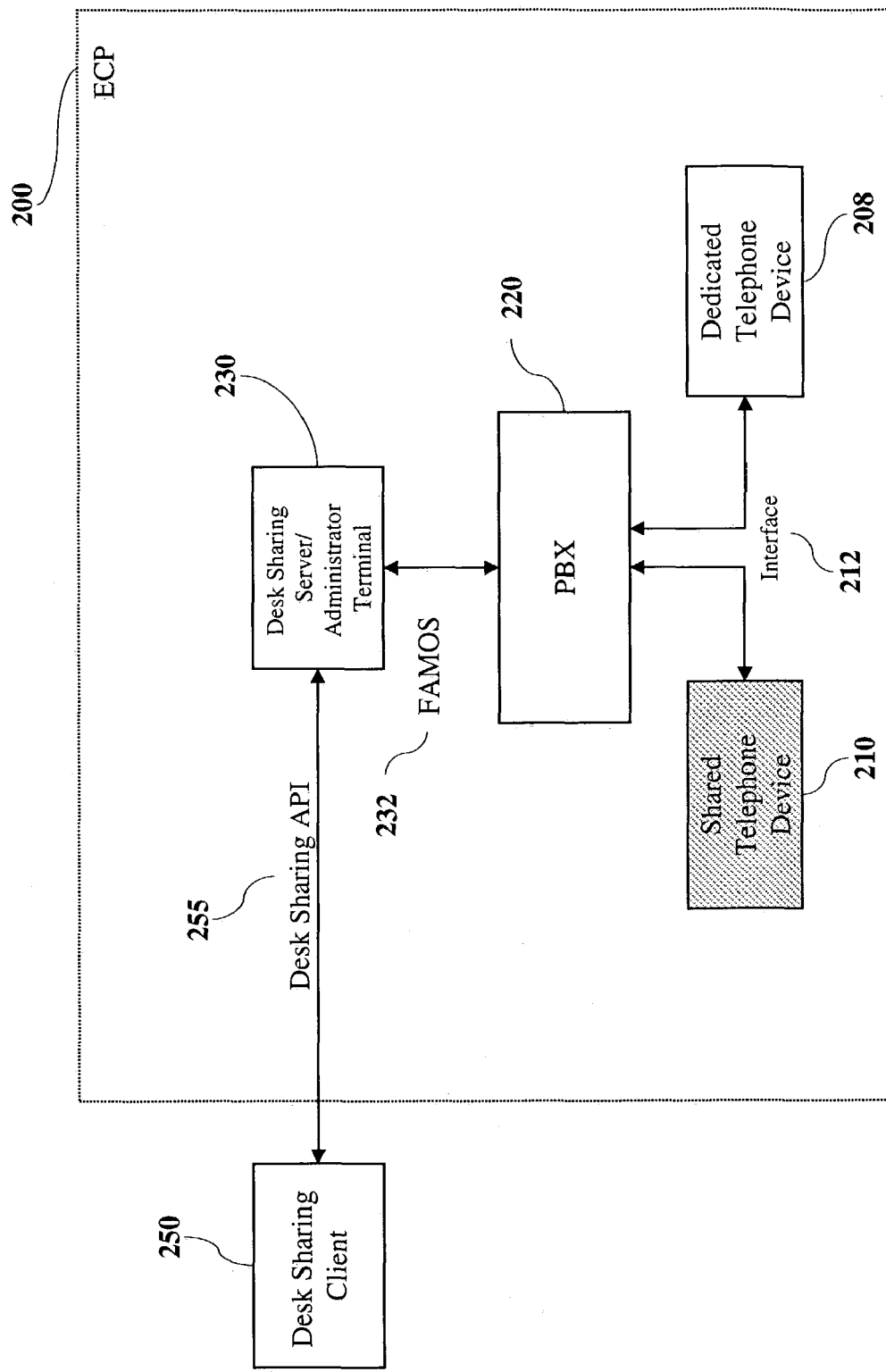
FIG. 1 is a block diagram of an ECP node with an integrated desk sharing application according to an illustrative embodiment of the present invention.

FIG. 1 is a block diagram of an illustrative embodiment of the present invention for an ECP node. In the illustrative embodiment of FIG. 1, ECP 200 comprises a PBX 220, a dedicated telephone device 208 and a shared telephone device 210. Both the dedicated telephone device 208 and the shared telephone device 210 are connected to PBX 220 using interface 212. It will be understood by one skilled in the art that any interface (e.g. other proprietary or standard) may be utilized instead of interface 212 so long as it accommodates the telephone devices 208 and 210 interface with the deployed PBX 220.

A desk sharing server 230 interfaces to the PBX 220 terminal using the proprietary FAMOS link 232, or other similar proprietary or standard interface which facilitates communications between the administrator terminal and the PBX. The desk sharing server 230 integrates the desk sharing application with the ECP administrative libraries and other client applications. Such integration allows these applications to share a single user interface and to be able to exchange data. The desk sharing server 230 acts as a translator between these various client applications and connects the applications to a single user interface. Thus, the administrator or telephone client may execute the desk sharing application and use the GUI to initiate ECP administrative functions, such as autoset relocate.

Furthermore, in this embodiment, the desk sharing server 230 allows the execution of an application that emulates the function of the administrator terminal. Such administrator terminal allows the ECP to interface to the PBX 220 using proprietary FAMOS link 232, or other similar proprietary or standard interface that facilitates communications between the administrator terminal and the PBX. In an alternative embodiment, instead of the FAMOS interface 232, a standard interface or a different proprietary interface is employed. The autoset relocate function, or a similar feature transfer function that allows complete or partial telephone user identity and feature functionality to be transferred, is used.

According to the present invention, the desk sharing server 230 and the ECP administrative libraries represent logical blocks that can be integrated on a single server (as described in this embodiment), or otherwise can reside on separate servers and interconnect using a standard or proprietary interface.

Furthermore, the ability of desk sharing server 230 to support an Application Programming Interface (API) further facilitates the integration of external applications with the ECP network. Such capability allows desk sharing applications from outside vendors to integrate with the ECP functions (e.g. autoset relocate) of ECP 200. In one exemplary embodiment, a desk sharing client 250, for example, from another vendor, communicates with desk sharing server 230 using desk sharing API 255.

In the illustrative embodiment of FIG. 1, the telephone devices 208 and 210 may be e.g. an IP phone, an ISDN phone or a digital PBX telephone. Otherwise, the dedicated telephone device 208 may be a virtual telephone that is represented as a database entry at the ECP 200 indicating the user identity and the preferred telephonic settings. In the present invention, both dedicated telephone device 208 and shared telephone device 210 must belong to the same ECP node 200.

When an authorized dedicated telephone user (for example 208), or an administrator representing the telephone user, executes the desk sharing application and requests to reserve a shared office space and the corresponding shared telephone device (for example, shared telephone 210) the desk sharing application initiates the transaction. If a telephone device is associated with the office space, the autoset relocate function is executed to impersonate the dedicated device. This function allows all telephone properties of the dedicated telephone device, including user identity and feature functionality to be transferred to the shared device. The administrative libraries will be updated with the new settings for the shared device. Consequently, the transported settings are relayed to the PBX 220 (and to the shared telephone device 210) via FAMOS link 232.

Figure 2:
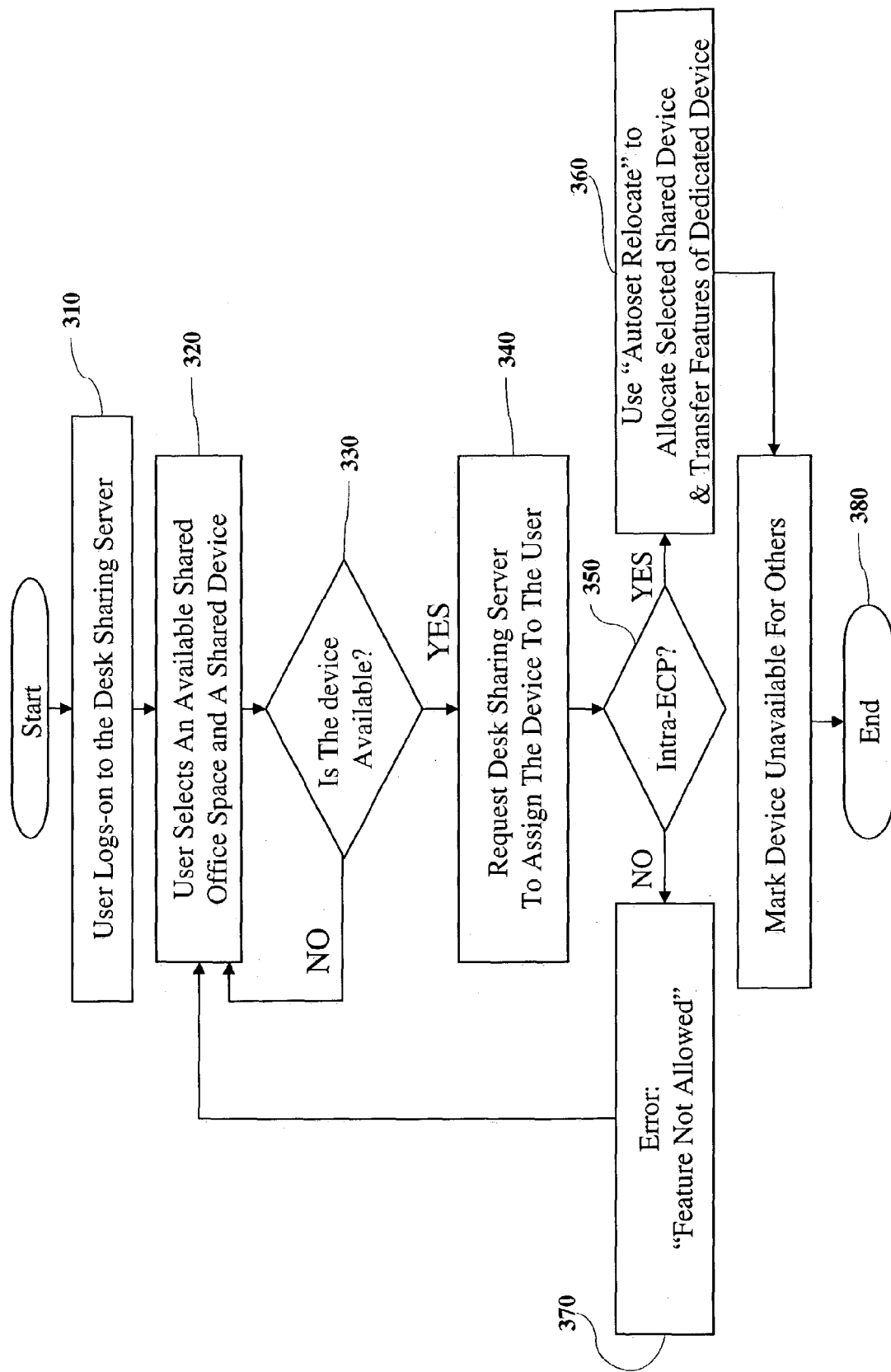
FIG. 2 is a sample flow diagram of the steps involved in performing device impersonation of a telephone device according to an illustrative embodiment of the present invention.

FIG. 2 illustrates the steps involved in performing the device impersonation (feature settings transfer resulting from using autoset relocate) between two telephone devices within the same ECP, according to an illustrative embodiment of the present invention. The procedure starts when the administrator or an authorized telephone user logs-on to the desk sharing server and executes the desk sharing application at 310. The user then identifies a shared working area and selects an associated shared telephone device at 320. The desk sharing application verifies the availability of the requested shared telephone device at 330. If the shared telephone device has already been allocated to another client/user or otherwise unavailable, the user is directed to restart the selection process at 320. Otherwise, if the shared telephone device is available, the desk sharing application assigns the shared telephone device to the requesting user at 340.

The application then determines at 350 if the dedicated telephone device and the shared telephone device belong to the same ECP. If the shared telephone device is associated with an ECP other than the ECP of the dedicated telephone, an error message is generated at 370 indicating that such capability is not available for this ECP. Alternatively, a different application may be executed for systems utilizing Computer Supported Telephony Application (CSTA) connectivity. If both devices belong to the same ECP, autoset relocate is used to allocate the selected shared device to the user and transfer all dedicated device attributes to the shared device at 360. When the device impersonation or relocation is complete, the application reports the status of the desk sharing procedure to the user and marks the shared device as unavailable to other users for the duration of the desk sharing period at 280. At the end of the reservation period, or when the user terminates the reservation of the shared device, the functional attributes of the dedicated and shared devices are reset to the pre-desk sharing status.

It is possible to extend the invention to other applications that may benefit from the integration with telephony applications, as will be understood by those skilled in the art. For example, using a Personal Digital Assistant (PDA) or a comparably equipped cellular telephone to browse through available vacant seats in a theater, a stadium, or a hotel and consequently utilize stored client preferences (location, price range, etc.) to narrow the search for a specific location.

Furthermore, the invention may be used for the assignment of "fixed resources" in order to move telephone users around office permanently or for an extended period of time, using a different platform such as, for example, the location assignment application instead of the desk sharing application described herein.

Without departing from the spirit and scope of the invention. It is therefore intended that the present invention is not limited to the disclosed embodiments but should be defined in accordance with the claims, which follow.

We claim:

1. A desk sharing method for transferring full user identity and feature functionality from a dedicated telephone device to a shared telephone device, wherein said dedicated telephone device and said shared telephone device belong to a single Enterprise Communication Platform (ECP) node, comprising the steps of:
   executing a desk sharing application;
   reserving an available shared telephone device; and
   said desk sharing application automatically impersonating full user identity and feature functionality from said dedicated telephone device to said shared telephone device.

2. The method of claim 1 wherein said desk sharing application is integrated with an administrative library of said single ECP.

3. The method of claim 1 wherein said step of reserving said available shared telephone device includes said desk sharing application determining availability of the reserved said shared telephone device and reserving at least one other shared resource.

4. The method of claim 3 wherein said other shared resource is a shared office space.

5. The method of claim 3 wherein said other shared resource is a shared computer.

6. The method of claim 1 wherein said step of automatically impersonating full user identity and feature functionality from said dedicated telephone device to said shared telephone device includes said desk sharing application using the autoset relocate ECP administrative function.

7. The method of claim 1 wherein said dedicated telephone device is a virtual telephonic device represented by a database entry at said ECP.

8. The method according to claim 1 wherein said desk sharing application employs an administrative interface of said ECP to perform said automatic impersonation of full user identity and feature functionality from said dedicated telephone device to said shared telephone device.

9. The method of claim 1 wherein said desk sharing application is outside of said ECP.

10. The method of claim 9 wherein a generic Application Programming Interface (API) is used to connect said desk sharing application to said ECP administrative library.

11. A desk sharing apparatus for impersonating full user identity and feature functionality from a dedicated telephone device to a shared telephone device, wherein said dedicated telephone device and said shared telephone device belong to a single Enterprise Communication Platform (ECP) node, comprising:
   means for executing a desk sharing application;
   means for receiving reservations for available shared telephone devices;
   means for automatically verifying availability for received said reservations;
   means for automatically assigning shared telephone devices responsive to verification of availability; and
   means for automatically impersonating full user identity and feature functionality from said dedicated telephone device to automatically assigned said shared telephone devices.

12. The apparatus of claim 11 wherein said desk sharing application is integrated with an administrative library of said single ECP.

13. The apparatus of claim 11 wherein said means for automatically assigning shared telephone devices comprises:
   means for reserving at least one other shared resource; and
   means for automatically reporting desk sharing status upon assigning shared resources and marked said shared resources unavailable.

14. The apparatus of claim 13 wherein said other shared resource is a shared office space.

15. The apparatus of claim 13 wherein said other shared resource is a shared computer.

16. The apparatus of claim 11 wherein said means for automatically impersonating full user identity and feature functionality from said dedicated telephone device to said shared telephone device includes using the autoset relocate ECP administrative function.

17. The apparatus of claim 11 wherein said dedicated telephone device is a virtual telephonic device represented by a database entry at said ECP.

18. The apparatus according to claim 11 wherein means for automatically assigning comprises an administrative interface of said ECP is employed to perform said automatic impersonation of full user identity and feature functionality from said dedicated telephone device to said shared telephone device.

19. The apparatus of claim 11 wherein said desk sharing application is outside of said ECP.

20. The apparatus of claim 19 wherein a generic Application Programming Interface (API) is used to connect said desk sharing application to said ECP administrative library.

* * * * *